(12) United States Patent
Mahajan et al.

(10) Patent No.: US 11,169,411 B1
(45) Date of Patent: Nov. 9, 2021

(54) TUNABLE MULTI-SPECTRAL LENS

(71) Applicant: Teledyne Scientific & Imaging, LLC, Thousand Oaks, CA (US)

(72) Inventors: Milind Mahajan, Thousand Oaks, CA (US); Dong-Feng Gu, Thousand Oaks, CA (US); Weiya Zhang, Thousand Oaks, CA (US); John Mansell, Thousand Oaks, CA (US)

(73) Assignee: Teledyne Scientific & Imaging, LLC, Thousand Oaks, CA (US)

( * ) Notice: Subject to any disclaimer, the term of this patent is extended or adjusted under 35 U.S.C. 154(b) by 0 days.

(21) Appl. No.: 17/000,224

(22) Filed: Aug. 21, 2020

(51) Int. Cl.
*G02F 1/1335* (2006.01)

(52) U.S. Cl.
CPC .. *G02F 1/133526* (2013.01); *G02F 1/133536* (2013.01); *G02F 1/133541* (2021.01); *G02F 2201/343* (2013.01)

(58) Field of Classification Search
CPC ......... G02F 1/133526; G02F 1/133536; G02F 1/133541; G02F 2201/343
USPC ....................................................... 349/115
See application file for complete search history.

(56) References Cited

U.S. PATENT DOCUMENTS

2020/0142254 A1* 5/2020 Ryu ..................... G02B 27/286

\* cited by examiner

*Primary Examiner* — Nathanael R Briggs
*Assistant Examiner* — William D Peterson
(74) *Attorney, Agent, or Firm* — M.J. Ram and Associates

(57) ABSTRACT

A multi-spectral lens comprises a circular polarizer and a tunable cholesteric filter having an associated reflection band. Incoming light is circularly polarized to one handedness by the circular polarizer, and the tunable cholesteric filter transmits the circularly polarized light and reflects the opposite handedness of the circularly polarized light if within the reflection band of the filter, with the reflection band of the tunable cholesteric filter varying with a control voltage. In a preferred embodiment, a mirror is arranged to receive light transmitted by the tunable cholesteric filter and reflect it back towards the filter with flipped handedness, with the reflected light with flipped handedness that is within the reflection band of the tunable cholesteric filter reflected by the tunable cholesteric filter back toward the mirror. The architecture described effectively converts the reflection band of a tunable cholesteric filter into a tunable bandpass filter for a multi-spectral imaging lens.

15 Claims, 1 Drawing Sheet

TUNABLE MULTI-SPECTRAL LENS

BACKGROUND OF THE INVENTION

Field of the Invention

This invention relates generally to lenses, and more particular to using a liquid crystal (LC) filter to create a multi-spectral lens.

Description of the Related Art

Multi-spectral imaging—i.e., obtaining multiple images of a given scene, with each image using light from a different portion of the electromagnetic spectrum—is of interest in a number of different fields, such as microscopy, crime scene analysis, aerial surveying, etc. Conventionally, this is accomplished by performing time-sequential imaging in narrow spectral bands. This can be done by, for example, placing a mechanical filter wheel in front of an imaging device. The wheel has different zones, each of which only passes light in a particular spectral band; in use, the wheel is rotated between each image capture such that a different filter zone is placed between the scene and the imaging device. However, this type of mechanical solution tends to be too bulky and slow for many applications.

Another known method of achieving multi-spectral imaging is using convectional multi-stage tunable birefringent filters, such as Liquid Crystal Lyot or Solc-type tilters. However, these filters require multiple LC stages and polarizers, have poor transmission, and tend to be costly and complex.

Non-time-sequential methods for obtaining multi-spectral imaging are also known. However, such methods require a very large number of pixels, or a compromise on image resolution.

SUMMARY OF THE INVENTION

A multi-spectral lens is presented which uses a tunable cholesteric liquid crystal band-block filter, preferably in a reflective lens design.

The present multi-spectral lens comprises a circular polarizer and a tunable cholesteric filter having an associated reflection band. The lens is arranged such that incoming light is circularly polarized to one handedness by the circular polarizer, with the tunable cholesteric filter arranged such that it transmits the circularly polarized light and reflects the opposite handedness of the circularly polarized light if within the reflection band of the tunable cholesteric filter, with the reflection band of the tunable cholesteric filter varying with a control voltage.

In a preferred embodiment, a mirror is arranged to receive light transmitted by the tunable cholesteric filter and reflect it back towards the filter with flipped handedness, with the reflected light with flipped handedness that is within the reflection band of the tunable cholesteric filter reflected by the tunable cholesteric filter back toward the metal mirror. The mirror preferably has an opening through which light reflected by the filter can pass, and an imaging device is arranged to receive light which passes through the opening. A system would typically be employed to provide the control voltage to the tunable cholesteric filter, with the system arranged to vary the control voltage and thereby the reflection band of the tunable cholesteric filter in a predetermined sequence and thereby provide multi-spectral imaging.

These and other features, aspects, and advantages of the present invention will become better understood with reference to the following drawings, description, and claims.

DETAILED DESCRIPTION OF THE INVENTION

Figure 1:
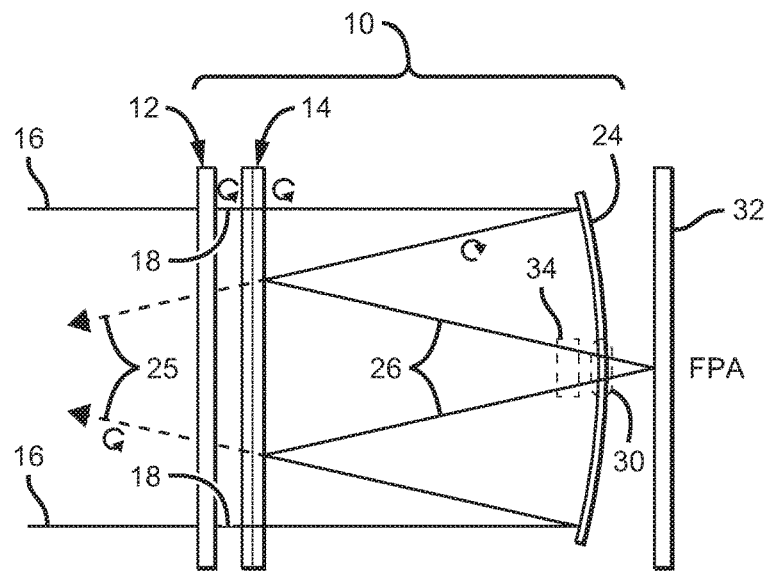
FIG. 1 is a diagram illustrating one possible embodiment of a multi-spectral lens per the present invention.

One possible embodiment of the present multi-spectral lens is shown in FIG. 1. The lens 10 comprises a circular polarizer 12, and a tunable cholesteric filter 14 having an associated reflection band—i.e., filter 14 operates as a band-block filter which reflects light of one circular polarization within a narrow band, with the band reflected based on the pitch and handedness of the cholesteric LC cell making up the filter. Lens 10 is arranged such that incoming light 16 is circularly polarized to one handedness by circular polarizer 12, with tunable cholesteric filter 14 arranged such that it transmits the "in-band" circularly polarized light 18, and reflects the opposite handedness of the circularly polarized light if within the reflection band of the tunable cholesteric filter.

Figure 2:
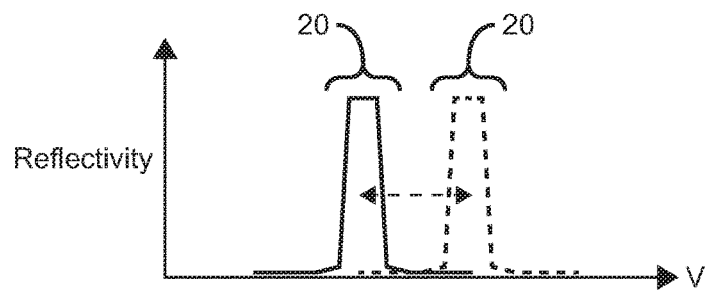
FIG. 2 is a plot illustrating how the reflection band of the tunable cholesteric filter component of the present multi-spectral lens varies with a control voltage.

As illustrated in FIG. 2, the reflection band 20 of tunable cholesteric filter 14 is varied with a control voltage across the cholesteric liquid crystal.

Referring back to FIG. 1, lens 10 also comprises a mirror 24, preferably a curved metal mirror, arranged to receive light transmitted by tunable cholesteric filter 14 and reflect it back towards the filter with flipped handedness, with the reflected light with flipped handedness that is within the reflection band of the filter (26) reflected by the filter back toward the mirror. Out of band light (25) transmits through filter 14, escapes the lens, and is not used for imaging.

Mirror 24 preferably includes an opening 30 through which the light 26 reflected by tunable cholesteric filter 14 back toward the mirror can pass. The system can then include an imaging device 32, such as a focal plane array (FPA), arranged to receive light which passes through opening 30. When so arranged, the only light reaching the FPA is circularly polarized, in-band light, with the band set by the tuning voltage. Alternatively, an imaging device 34, such as an FPA, could be positioned between tunable cholesteric filter 14 and mirror 24, with the system arranged such that light reflected by filter 14 back toward mirror 24 is received by imaging device 34.

In practice, a tuning voltage is provided which establishes a particular band to be passed to imaging device 32. An image within the selected band is detected and typically stored. The tuning voltage is then changed to select a different band to be passed, another image is taken, and so on.

When arranged as described, with a tunable cholesteric LC band-block filter in a reflective lens design, a multi-spectral lens is provided, with the cholesteric reflection band controlled as discussed above and shown in FIG. 2. The configuration's reflective geometry enables a tunable cholesteric LC band-block filter to act as a secondary mirror of a catadioptric lens. Using a single active cell 14 and a single polarizer 12 enables very high throughput at a fraction of the fabrication cost when compared with other approaches, some of which require five or more LC cells. The lens performance is relatively insensitive to temperature changes, and no complex calibration is required.

As noted above, mirror 24 is preferably a curved metal mirror. Mirror 24 may be implemented with a Mangin mirror—i.e., a negative meniscus lens with a reflective surface on the rear side of the glass forming a curved mirror that reflects light.

Circular polarizer 12 is essential, as tunable cholesteric filter 14 only works with light that is circular polarized. The polarizer is preferably broadband—i.e., operates over a wavelength range which is larger than the cholesteric reflection band (with the cholesteric reflection band arranged to be tuned within this wavelength range)—and preferably comprises an absorptive linear polarizer and a broadband quarter wave plate (QWP) (which is typically composed of multiple birefringent layers). An absorptive polarizer is preferred, as a reflective cholesteric circular polarizer will result in stray light bouncing back and forth. Alternate implementations of a broadband reflective polarizer are also feasible.

Circular polarizer 12 may also include a fixed bandpass filter which passes a broad, but limited range of wavelengths to block the light outside of the design wavelength range of the filter and the multi-spectral lens. A fixed bandpass filter, if present, will have a bandwidth substantially larger than the bandwidth within which the tunable cholesteric filter reflects. Also note that this bandpass filter could be located at other locations in the lens system.

Figure 3:
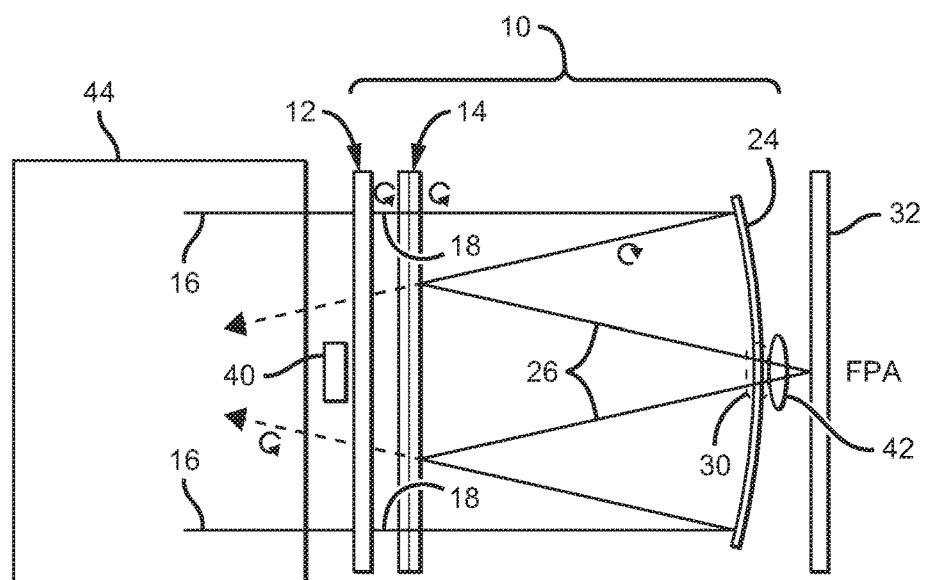
FIG. 3 is a diagram illustrating another possible embodiment of a multi-spectral lens per the present invention.

Several possible optional features are illustrated in FIG. 3. For example, the lens may include a central obscuration (40) at the entrance aperture of the lens to block light that can otherwise leak directly through the opening in the mirror, improving contrast and image quality.

As another example, an intermediate refractive lens (42) or lenses may be added in the optical path near the opening 30 in mirror 24 to improve image quality and the field of view of the lens.

Another possible optional feature is a lens hood (44), which can reduce stray light and improve image quality.

A multi-spectral lens as described herein would typically be used with a system arranged to provide the control voltage to the tunable cholesteric filter (14), with the system arranged to vary the control voltage and thereby the reflection band of the tunable cholesteric filter in a predetermined sequence and thereby provide multi-spectral imaging.

The present multi-spectral lens has numerous applications, including, for example, microscopy, crime scene analysis, and aerial surveys.

The embodiments of the invention described herein are exemplary and numerous modifications, variations and rearrangements can be readily envisioned to achieve substantially equivalent results, all of which are intended to be embraced within the spirit and scope of the invention as defined in the appended claims.

We claim:

1. A multi-spectral lens, comprising:
 a circular polarizer,
 a tunable cholesteric filter having an associated reflection band; and
 a mirror arranged to receive light transmitted by said tunable cholesteric filter and reflect it back towards said filter with flipped handedness, said reflected light with flipped handedness that is within the reflection band of said tunable cholesteric filter reflected by said tunable cholesteric filter back toward said mirror;
 arranged such that incoming light is circularly polarized to one handedness by said circular polarizer, and said tunable cholesteric filter is arranged such that it transmits said circularly polarized light and reflects the opposite handedness of said circularly polarized light if within the reflection band of said tunable cholesteric filter, with the reflection band of said tunable cholesteric filter varying with a control voltage.

2. The multi-spectral lens of claim 1, wherein said light reflected by said tunable cholesteric filter back toward said mirror is received by an imaging device.

3. The multi-spectral lens of claim 1, wherein said mirror comprises an opening through which said light reflected by said tunable cholesteric filter back toward said mirror can pass.

4. The multi-spectral lens of claim 3, further comprising an imaging device arranged to receive light which passes through said opening.

5. The multi-spectral lens of claim 4, wherein said imaging device comprises a focal plane array (FPA).

6. The multi-spectral lens of claim 3, further comprising a central obscuration arranged to block light that can otherwise leak directly through said opening in said mirror.

7. The multi-spectral lens of claim 3, further comprising an intermediate refractive lens or lenses in the optical path of said lens near said opening in said mirror.

8. The multi-spectral lens of claim 1, further comprising a lens hood.

9. The multi-spectral lens of claim 1, wherein said mirror is a curved metal mirror.

10. The multi-spectral lens of claim 1, wherein said mirror is a Mangin mirror.

11. The multi-spectral lens of claim 1, wherein said circular polarizer comprises an absorptive linear polarizer and a QWP.

12. The multi-spectral lens of claim 1, further comprising a system arranged to provide said control voltage to said a tunable cholesteric filter, said system arranged to vary said control voltage and thereby the reflection band of said tunable cholesteric filter in a predetermined sequence and thereby provide multi-spectral imaging.

13. A multi-spectral lens, comprising:
 a circular polarizer,
 a tunable cholesteric filter, said circular polarizer and said tunable cholesteric filter arranged such that incoming light is circularly polarized by said circular polarizer, and said tunable cholesteric filter transmits the said circularly polarized light and reflects the handedness opposite to said circularly polarized light if within reflection band of tunable cholesteric filter, said tunable cholesteric filter tuned with a control voltage such that its reflection band varies with said control voltage;
 a curved metal mirror arranged to receive light transmitted by said tunable cholesteric filter back and reflect it back towards said filter with flipped handedness, said reflected light with flipped handedness if within the reflection band of said tunable cholesteric filter reflected by said tunable cholesteric filter back toward said metal mirror, said metal mirror comprising an opening through which said light reflected by said tunable cholesteric filter back toward said metal mirror can pass;
 an imaging device arranged to receive light which passes through said opening; and
 a system arranged to provide said control voltage to said tunable cholesteric filter, said system arranged to vary said control voltage and thereby the reflection band of said tunable cholesteric filter in a predetermined sequence and thereby provide multi-spectral imaging.

14. The multi-spectral lens of claim 13, wherein said imaging device is a focal plane array (FPA).

15. The multi-spectral lens of claim 13, wherein said circular polarizer comprises an absorptive linear polarizer and a QWP or a cholesteric circular polarizer.

* * * * *